United States Patent Office 2,710,903
Patented June 14, 1955

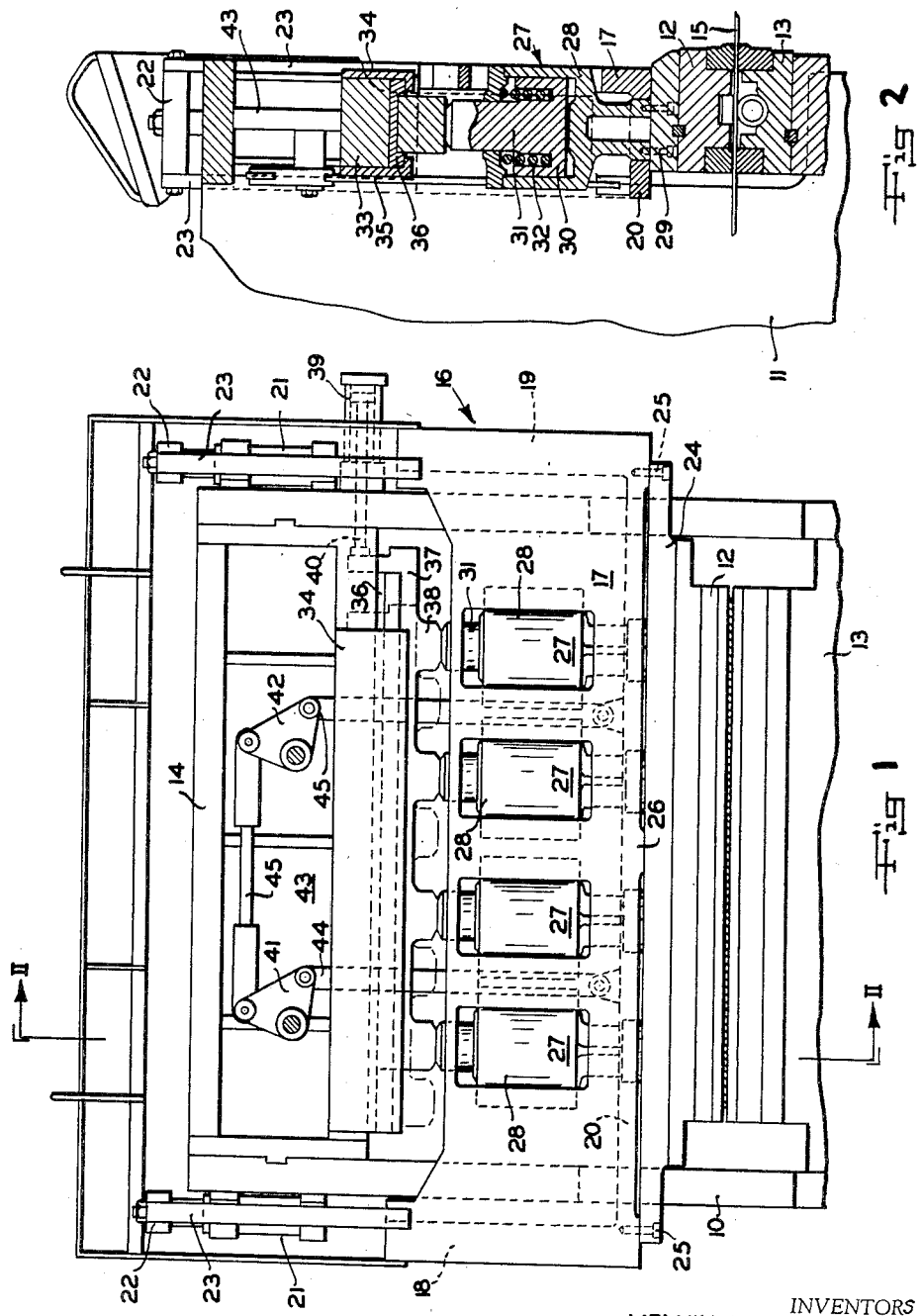

2,710,903

WORK HOLDING APPARATUS FOR FLASH-BUTT WELDING MACHINE

Melvin M. Seeloff and Robert Anderson, Warren, Ohio, assignors to The Taylor-Winfield Corporation, Warren, Ohio, a corporation of Ohio Application April 17, 1952, Serial No. 282,766

9 Claims. (Cl. 219—17)

The present invention relates to electric resistance welding apparatus, and more particularly to improved features of flash-butt welding machines whereby clamping of metal strip and sheet workpieces may be carried out in a more effective and expedient manner.

Our invention particularly concerns flash-butt welding of wide strip and coiled sheets of metal in continuous strip processing lines, for example, where rapid and accurate accomplishment of end-to-end welding of successive lengths of the metal sections is an important factor in the successful operation of the processing line.

Effective end-to-end welding of thin strip sections, particularly where strip width is many times greater than the thickness, requires highly accurate positioning and holding of the workpieces during the welding operation. To insure gripping of the wide workpieces across the entire face thereof very high clamping pressures are necessary and heavy-duty equipment is required. With heretofore known operating arrangements the use of such heavy-duty equipment has caused the operations of clamping and releasing the workpieces to be unnecessarily slow and time consuming in relation to the power available for this purpose. Accordingly it is an object of this invention to provide a strip clamping mechanism for use in strip welding machines of the type described whereby speed of operation may be materially increased without increasing the power requirements of the apparatus.

Specifically the invention teaches the use of large diameter hydraulic actuating devices for applying clamping pressure to the work combined with a novel arrangement for disengaging and rendering inoperative the large diameter actuators whereby the work holding dies may be rapidly and easily separated by means of low power quick-acting devices.

Another object of the invention resides in the provision of a work clamping arrangement for flash-butt welding wide metal strip utilizing small quick-acting hydraulic devices for effecting rapid opening and closing movement of the work holding dies and incorporating a novel arrangement for mechanically stabilizing motion of the movable die member in opening or closing directions. Our construction, as will become apparent, provides stabilized and accurately guided die motion even though the opening and closing force applied to the movable die member may be substantially unbalanced, as may be caused, for example, by day-to-day variations in the frictional characteristics of the hydraulic actuating devices.

Yet another object of this invention is the provision of a novel strip clamping mechanism of the general character described wherein, for the purpose of applying high clamping pressure to the workpieces, a plurality of large diameter single-acting push-type hydraulic actuating devices may be utilized. The present arrangement eliminates many of the objectionable features of heretofore used double-acting devices, one of the more important of which is the use of pressurized piston rod packings required by all double-acting devices.

Another object of the present invention resides in the provision of a work clamping arrangement for flash-butt welding wide thin metal strip whereby even and continuous clamping pressure across the entire face of the work may be more readily and effectively obtained.

The above and other objects and advantages of the invention will become apparent upon full consideration of the following detailed specification and accompanying detailed drawing wherein is illustrated a preferred embodiment of our invention.

In the drawing:

Figure 1 is a fragmentary front elevation of a flash-butt welding machine wherein is incorporated our novel arrangement for clamping and holding wide strip; and Figure 2 is a section view taken generally along line II—II of Figure 1.

Referring to the drawing, numerals 10 and 11 designate spaced upstanding frame members utilized for supporting die members 12 and 13 of a flash-butt welding machine. Frame members 10 and 11 are rigidly connected across the top by a beam 14, and across the bottom by suitable means, not shown, whereby to form a rigid structure having a window-like opening therein. The rigid structure thus formed, including the die members 12 and 13 carried thereby, forms either the fixed or movable platen of a welding machine depending on whether the frame members 10 and 11 are fixedly mounted or are slidably movable toward and away from a second set of die members, not shown. This is in accord with known and accepted welder construction.

In the illustrated embodiment of our invention the lower die member 13 is rigidly secured in horizontally disposed relation to frame members 10 and 11, while upper die member 12 is adapted for vertical movement toward and away from the lower die 13 whereby to effect clamping of a wide strip 15 therebetween. The present invention relates to a novel mechanism for expediting vertical movement of the upper die member 12 as will appear.

Slidably mounted on the frame members 10 and 11, and having any of various well-known guide means, not specifically indicated, for restricting sliding movement to a vertical direction, is a rigid carrier 16 having a front wall 17 and side and bottom walls 18—20. According to the teachings of the invention carrier 16 is adapted for rapid vertically upward and downward movement, and to effect such movement we have mounted a small diameter double-acting hydraulic actuator 21 to each of the frame members 10 and 11 as shown in Figure 1. To the piston rod of each actuator 21 is connected a horizontally disposed yoke 22 which is in turn rigidly connected with a side wall 18 or 19 of the carrier 16 by means of depending connecting members 23.

Secured to the lower wall 20 of carrier 16, preferably at each end only thereof, is a semi-flexible die mounting member 24, to the lower side of which is secured the upper die member 12. In accordance with the principles of our invention the die mounting member 24 is secured by suitable bolts 25 at each end of the carrier 16, and the bottom wall 20 of carrier 16 is relieved substantially across its entire face with the exception of a small "back-up" area 26 in the center. Die 12 may be secured to the mounting member 24 in any suitable manner.

For applying high clamping pressure to dies 12 and 13 we have provided a plurality of large diameter single-acting hydraulic actuators 27, the cylinder member 28 of which is secured directly to the semi-flexible or deformable die mounting member 24 by means of bolts 29 or other devices. Suitable apertures are provided in the bottom wall 20 of carrier 16 whereby cylinders 28 may be secured in direct contact with mounting member 24, and it is in accordance with this invention that cylinders 28 be movable with respect to the carrier 16 rather than secured thereto.

Piston members 30 of actuators 27 are provided with short upwardly extending piston rods 31 which are preferably of relatively large diameter having substantially flat end surfaces. Coil springs 32 act between the upper ends of cylinders 28 and the upper surfaces of pistons 31 whereby to normally urge the pistons 31 in a downward direction.

Secured to frame members 10 and 11 and extending horizontally therebetween is a rigid beam 33 which is positioned above the ends of piston rod 31 in spaced relation thereto. L-shaped guide members 34 and 35 are secured to the sides of beam 33 in the manner shown in Figure 2 whereby a partially enclosed guide way is formed by the lower surface of member 33 and the upper surfaces of the horizontal reaches of L-shaped members 34 and 35. Slidably retained in the guide way thus formed is a flat bearing plate 36 which supports, by rigid interconnection, an abutment bar 37 having a plurality of downwardly extending projections 38 thereon. As indicated in Figure 1 the downwardly extending projections are adapted to normally overlie the ends of piston rods 31 whereby upon application of fluid pressure to the lower sides of pistons 30, cylinders 28, and hence die mounting member 24 and die 12, will tend to move downwardly with respect to the rigid beam 33. In this manner high clamping pressure may be applied to a strip 15 positioned between dies 12 and 13.

It will be understood that the pressure exerted by the plurality of actuators 27 is applied through the intermediary of the deformable die holding member 24 whereby the die member 12 may be slightly flexed, if necessary, to apply even and continuous pressure to a strip 15 of uneven thickness.

To raise the upper die member 12 following a welding operation to permit free passage through the welding machine of the continuous strip thus formed we have provided means for laterally shifting the abutment bar 37 whereby to position downwardly extending projections 38 in offset relation to piston rods 31 as indicated by the broken lines of Figure 1. With bar 37 in such shifted position actuators 27 are effectively disconnected from the apparatus and rendered inoperative, and upon application of fluid pressure to the lower end of small diameter actuators 21 carrier 16 and die 12 will be rapidly raised from the strip 15. It will be readily understood that raising of the carrier 16 by means of small diameter actuators 21 may be accomplished with a relatively low volume of hydraulic fluid, and accordingly the operation may be carried out in a minimum of time with hydraulic circuitry of normal capacity.

Lateral shifting of bar 37 is readily accomplished in the illustrated apparatus by providing a horizontally disposed hydraulic or air-operated actuator 39 which is secured to frame member 11 and connects bar 37 by means of an elongated piston rod 40. By applying hydraulic or air pressure to an appropriate end of actuator 39 bar 37 may be shifted to the left into an inoperative position, or to the right into an operating position as may be desired.

Where, as contemplated by the illustrated apparatus, strip widths upwards of fifty to sixty inches must be accommodated, it is often difficult to accurately guide vertical movement of the die 12 to prevent binding of the relatively movable parts. Since height restrictions in many cases render it impractical to provide sufficient guiding contact between the carrier 16 and frame members 10 and 11, we have provided an arrangement which is operative exclusive of the guiding contact between carrier 16 and the frame members to stabilize movement of the carrier 16 whereby the same will at all times be horizontally disposed and accurately aligned in its guide ways.

As illustrated in Figure 1, we have provided a pair of bell crank members 41 and 42 which are substantially identical in all respects. The bell cranks are pivotally mounted in widely spaced relation to a web section 43 which extends between beams 14 and 33 and forms a part of the rigid frame of the apparatus. Pivotally secured to cranks 41 and 42 are connecting rods 44 and 45 respectively which depend downwardly and are in turn connected to the bottom wall 20 of carrier 16. Second legs of each of the cranks 41 and 42 are interconnected by means of a horizontally disposed rod 45, and it should be apparent that any pivotal movement of one crank will be duplicated by the other. Accordingly, wherein raising or lowering the carrier 16 by means of actuators 21 one side of the carrier 16 tends to move more rapidly than the other, such unequal motion will be transferred through the medium of bell cranks 41 and 42 to the opposite side of the carrier to maintain the same at all times in proper alignment.

Prior to the start of a welding operation in our apparatus bar 37 is positioned to the left in an inoperative position and hydraulic pressure is maintained in the lower ends of small diameter actuators 21 to hold carrier 16 in an upraised position. No pressure exists in large diameter actuators 27 and accordingly the pistons 30 thereof are fully bottomed by the action of springs 32.

Upon the strip 15 being drawn into position for end-to-end welding to a subsequent strip, pressure is applied to the upper ends of actuators 21 to cause carrier 16 and upper die 12 to descend rapidly onto the strip. When the die 12 meets the strip 15 pressure is applied to the rod end of actuator 39 to shift bar 37 into an operative position as shown in Figure 1; it being understood that the orientation of parts is such that a slight clearance is provided between the upper ends of piston rods 31 and the lower end surfaces of projections 38 whereby bar 37 may be rapidly drawn to the right by a small actuator. With the parts in the position shown, pressure is applied to actuators 27. Pistons 31 move upwardly into contact with rigidly backed projections 38, whereupon cylinders 28 are forced downwardly to firmly clamp the strip 15 across its width.

To release the strip 15 subsequent to a welding operation, pressure is first removed from actuators 27. Pistons 30 are of course forced downwardly by springs 32 and thus the slight clearance space is established between piston rods 31 and projections 38 whereby to permit easy and rapid shifting of bar 37 to the left. Pressure may then be applied to the lower ends of actuators 21 to rapidly raise carrier 16 away from the strip.

It should thus be apparent that we have accomplished the objects initially set forth. The apparatus of our invention provides an arrangement for clamping and releasing workpieces in a flash-butt welding machine which is substantially more rapid and effective than has been heretofore possible. We have taught a novel combined use of large diameter and small diameter actuating devices whereby full opening and closing movement of workpiece holding dies may be accomplished in a minimum of time by means of small and quick-acting actuators and whereby a uniformly high clamping pressure may be obtained by means of large diameter and relatively slow-acting actuators. We have taught a new construction whereby although the total opening and closing movement of the clamping apparatus may be several inches, the necessary movement of the large diameter actuating devices may be but a small fraction of an inch—sufficient merely to close the small clearance space between piston rods 31 and projections 38 and to deform the strip 15 under clamping pressure. Time consuming filling and exhausting of the large diameter actuators is thus substantially eliminated while full clamping effectiveness provided by large diameter actuators is retained in its entirety.

A further important advantage accruing from our construction resides in the fact that the large diameter actuators 27 may be of the single-acting spring-returned type. Leakage of the high pressure fluid may thus be readily collected and drained off, whereas in the past such fluid often escaped around the piston rod and flowed downwardly onto the dies and work.

We have also shown a construction wherein relatively inexpensive small diameter actuators may be utilized to rapidly open and close work holding dies of large strip welding apparatus wherein guide ways of a minimum length are provided. By stabilizing the movement of carrier 16 through the medium of bell cranks 41 and 42 and associated mechanical linkage any tendency of unequal or unbalanced movement of the carrier 16, as caused by variations in the actuators 21 for example, is effectively counterbalanced. Guiding contact between carrier 16 and frame members 10 and 11 may accordingly be maintained at a minimum to conform with desired machine height limitations.

Our invention further teaches a novel construction of securing a plurality of large-diameter single-acting hydraulic actuating devices to a deformable die mounting member whereby the die and mounting member may be flexed where necessary to conform with surface irregularities in the stock being clamped. In our apparatus semi-rigid die mounting member 24 is secured to the rigid carrier 16 only at the ends whereby the die may be raised and lowered by means of the carrier 16. But it will be noted that the mounting member 24 is otherwise wholly independent of carrier 16 and that clamping pressure is applied by actuators 27 directly to the mounting member 24 rather than through the carrier 16.

The above specifically described embodiment should be considered as illustrative only since many modifications may be made therein without departing from the spirit of the invention. Reference should therefore be had to the appended claims in determining the true scope of the invention.

We claim:

1. In an electric resistance welding machine of the type having a rigid frame, upper and lower die members carried by said frame, said upper die member being movable in said frame toward and away from said lower die member, and power operated means for moving said upper die member; the improvement which consists of a carrier mounted on said frame and adapted for movement thereon toward and away from said lower die member, means for mounting said upper die member to said carrier, small diameter fluid actuators connecting said frame and said carrier for moving said carrier rapidly toward and away from said lower die member, a plurality of large diameter fluid actuators mounted in rigidly interconnecting relation to said upper die member and extending upwardly therefrom, a rigid abutment bar mounted on said frame and positioned above said large diameter actuators, said bar having downwardly extending projections thereon adapted to normally overlie the upper ends of said large diameter actuators whereby upon application of fluid pressure to said large diameter actuators said upper die member may be caused to move downwardly with respect to said abutment bar, and means to shift said bar to move said projections from a position overlying said large diameter actuators to a position offset therefrom.

2. In an electric resistance welding machine of the type having a rigid frame, upper and lower die members carried by said frame, said upper die member being movable in said frame toward and away from said lower die member, and power operated means for moving said upper die member; the improvement which comprises a rigid carrier for said upper die member, means including a deformable member for mounting said upper die to said carrier, small diameter fluid actuators connecting said carrier and said frame for moving said carrier rapidly toward and away from said lower die member, large diameter fluid actuators carried by said deformable member and extending upwardly therefrom, a rigid abutment bar mounted on said frame above said large diameter actuators, said bar having a plurality of downwardly extending projections adapted to normally overlie said large diameter actuators whereby upon application of fluid pressure to said large diameter actuators to cause extension thereof said deformable member and said upper die are forced downwardly, and means connecting said frame and said bar for shifting said bar to position said projections in offset relation to said large diameter actuators.

3. Apparatus according to claim 2 further characterized by said large diameter actuators being of the single-acting spring-returned type and each including a cylinder and piston, said cylinders being mounted on said deformable member, and said pistons extending upwardly therefrom toward said abutment bar.

4. In an electric resistance welding machine of the type having a rigid frame, upper and lower die members carried by said frame, said upper die member being movable in said frame toward and away from said lower die member, and power operated means for moving said upper die member; the improvement which consists of low power quick-acting actuating devices for moving said upper die member toward and away from said lower die member, large diameter fluid actuators adapted to act on said rigid frame and said upper die member to urge said upper die member toward said lower member under high pressure, and abutment means normally interposed between said actuators and said frame and adapted to be moved out of interposition to render said actuators inoperative to act upon said frame whereby movement of said upper die by said quick-acting devices may be effected independently of said fluid actuators.

5. In an electric resistance welding machine of the type having a rigid frame, and die members movable in said frame toward and away from each other; the combination of a quick-acting power device connecting one of said die members and adapted to move said one of said die members rapidly toward or away from the other of said die members, a high power actuating device adapted to act on said frame and said one of said die members to urge the latter toward said other die member under high pressure, and rigid means normally interposed between said high power actuating device and said frame but adapted to be moved out of interposition whereby said high power actuating device is inoperative to act upon said frame, said one of said die members being then movable independently of said high power actuating device.

6. In an electric resistance welding machine of the type having a rigid frame, a fixed die member, and a movable die member; the combination of a low-power quick-acting device for moving said movable die member toward and away from said fixed die member, an extendible and retractible high power actuating device for urging said movable die member toward said fixed die member under high pressure, and rigid retractible means to mechanically interconnect said high power device with said frame, said movable die being movable independently of extending or retracting movement of said high power device when said last mentioned means is retracted.

7. In an electric resistance welding machine of the type having a rigid frame, upper and lower die members carried by said frame, said upper die member being movable in said frame toward and away from said lower die member, and power operated means for moving said upper die member; the improvement which comprises a carrier for said upper die member mounted on said frame for guided sliding movement toward and away from said lower die member, said carrier being of greater width than height, low power quick-acting fluid actuators mounted at the sides of said carrier and connecting said frame for moving said carrier, means to stabilize the movement of said carrier in rapid movement comprising a pair of bell cranks mounted on said frame in spaced relation and each having a leg interconnected with said carrier and means interconnecting said bell cranks, high power actuators for urging said upper die member toward said lower die member under high pressure, and means to selectively render said high power actuators inoperative whereby said carrier may be moved independently of said high power actuators.

8. In an electric resistance welding machine of the type having a rigid frame, upper and lower die members carried by said frame, said upper die member being movable in said frame toward and away from said lower die member, and power operated means for moving said upper die member, said die members being adapted for the reception and clamping therebetween of wide metal strip or sheet; the improvement which consists of a carrier for said upper die member, means mounting said upper die member to said carrier including a deformable member, said deformable member being secured to said carrier only at the ends thereof and said upper die member being secured to the lower side of said deformable member, a plurality of spaced high power single-acting fluid actuators each including a cylinder and a piston, said cylinders being secured to said deformable member and extending upwardly therefrom, said pistons extending upwardly from said cylinders, and rigid abutment means overlying said pistons whereby upon application of fluid pressure to said cylinders said deformable member will be urged downwardly away from said abutment means.

9. In an electric resistance welding machine of the type having a rigid frame, upper and lower die members carried by said frame, one of said die members being movable in said frame toward and away from the other die member, and power operated means for moving said one of said die members, the improvement comprising a carrier for said one of said die members, means mounting said one of said die members to said carrier including a deformable member, said deformable member being secured to said carrier at widely spaced points, a plurality of single acting fluid actuators secured to said deformable member, rigid abutment means interposed between said actuators and said frame, said actuators being arranged to act between said abutment means and deformable member to urge said die members together, means to retract said abutment means, and means to move said carrier upon retraction of said abutment means.

References Cited in the file of this patent

UNITED STATES PATENTS

| | | |
|---|---|---|
| Re. 22,163 | Ernst | Aug. 25, 1942 |
| 2,356,790 | Horne | Aug. 29, 1944 |
| 2,387,190 | Stone | Oct. 16, 1945 |